US009405729B2

(12) United States Patent
Clavier et al.

(10) Patent No.: US 9,405,729 B2
(45) Date of Patent: Aug. 2, 2016

(54) CRYPTOGRAPHIC METHOD COMPRISING A MODULAR EXPONENTIATION OPERATION

(71) Applicant: INSIDE SECURE, Meyreuil (FR)

(72) Inventors: Christophe Clavier, Rilhac Lastours (FR); Vincent Verneuil, Aix en Provence (FR)

(73) Assignee: Inside Secure, Meyreuil (FR)

( * ) Notice: Subject to any disclaimer, the term of this patent is extended or adjusted under 35 U.S.C. 154(b) by 351 days.

(21) Appl. No.: 14/072,155

(22) Filed: Nov. 5, 2013

(65) Prior Publication Data

US 2014/0129604 A1  May 8, 2014

(30) Foreign Application Priority Data

Nov. 7, 2012  (FR) ...................................... 12 60553

(51) Int. Cl.
*G06F 17/10* (2006.01)
*G06F 7/72* (2006.01)
*H04L 9/00* (2006.01)
*H04L 9/30* (2006.01)

(52) U.S. Cl.
CPC ................ *G06F 17/10* (2013.01); *G06F 7/723* (2013.01); *H04L 9/003* (2013.01); *H04L 9/3046* (2013.01); *G06F 2207/729* (2013.01); *G06F 2207/7261* (2013.01); *G06F 2207/7266* (2013.01)

(58) Field of Classification Search
None
See application file for complete search history.

(56) References Cited

U.S. PATENT DOCUMENTS

| 7,742,595 | B2 | 6/2010 | Joye et al. | |
|---|---|---|---|---|
| 2001/0002486 | A1* | 5/2001 | Kocher | G06F 7/723 713/171 |
| 2004/0114756 | A1* | 6/2004 | Moller | G06F 7/725 380/30 |
| 2007/0291937 | A1* | 12/2007 | Katagi | G06F 7/725 380/30 |
| 2010/0095133 | A1* | 4/2010 | Peter | G06F 7/00 713/189 |
| 2012/0221618 | A1 | 8/2012 | Feix et al. | |

FOREIGN PATENT DOCUMENTS

EP     2 492 804 A1    8/2012
WO     WO 03/083645 A2    10/2003

OTHER PUBLICATIONS

Koç, "Analysis of Sliding Window Techniques for Exponentiation," *Computers Math. Applic.*, 1995, vol. 30, No. 10, pp. 17-24.
Sep. 9, 2013 Written Opinion issued in French Patent Application No. FR1260553 (with English translation).
(Continued)

*Primary Examiner* — Michael D Yaary (57) ABSTRACT

The present invention relates to a method for performing an iterative calculation of exponentiation of a large datum, the method being implemented in an electronic device (DV1) and comprising calculations of squaring and multiplying large variables performed in parallel, by squaring (SB1) and multiplication (SM1) blocks, the method comprising steps of: while a temporary storage buffer memory is not full of unused squares, triggering a calculation by the squaring block for a bit of the exponent, when the squaring block is inactive, storing each square provided by the squaring block in the buffer memory, if the bit of the corresponding exponent is on 1, and while the buffer memory contains an unused square, triggering a calculation by the multiplication block concerning the unused square, when the multiplication block is inactive.

18 Claims, 3 Drawing Sheets

(56) References Cited

OTHER PUBLICATIONS

Sep. 9, 2013 Search Report issued in French Patent Application No. FR1260553 (with English translation).
Amiel et al., "Distinguishing Multiplications from Squaring Operations," *Selected Areas in Cryptography*, 2008, vol. 5381 of Lecture Notes in Computer Science, Springer.
Chevallier-Mames et al., "Low-Cost Solutions for Preventing Simple Side-Channel Analysis: Side-Channel Atomicity," *IEEE Transactions on Computers*, Jun. 2004, pp. 1-16, vol. 53 issue 6.
Ansari et al. "Parallel Scalar Multiplication for Elliptic Curve Cryptosystems," *IEEE*, May 27, 2005, pp. 71-73, vol. 1.
Aigner et al., "Power Analysis Tool," Jun. 1, 2000, pp. 1-15, http://www.iaik.tugraz.at/content/research/implementation_attacks/introduction_to_impa/dpa_tutorial.pdf.

* cited by examiner

CRYPTOGRAPHIC METHOD COMPRISING A MODULAR EXPONENTIATION OPERATION

The present invention relates to a method for performing an iterative calculation of the result of the exponentiation of a datum m by an exponent d, implemented in an electronic device.

Various known cryptographic methods are based on the modular exponentiation operation, the mathematical expression of which is:

$m^d$ modulo($n$), m being an input datum, d an exponent and n a modulus. The modular exponentiation function involves calculating the rest of the division by n of m to the power of d.

Such a function is used by various cryptographic algorithms such as the RSA algorithm (Rivest, Shamir and Adleman), the DSA algorithm ("Digital Signature Algorithm"), El Gamal, etc. The datum m is generally a message to be ciphered or deciphered or a message to be signed or a signature to be checked, and the exponent d is a private or public key.

One well-known method involves executing a modular exponentiation calculation by means of the "Square & Multiply" algorithm A1 or A1' appearing in Appendix I.

The algorithm A1 is said to be "from left to right" as the first steps of the calculation loop start with the most significant bits of the exponent up to the least significant bits. The algorithm A1' is said to be "from right to left" as the first steps of the calculation loop start with the least significant bits of the exponent, up to the most significant bits.

These algorithms comprise for each iteration, i.e. each bit of the exponent, a multiplication of two identical large variables and if the bit of the exponent processed by the iteration is equal to 1, a multiplication of two different large variables. Different functions are generally used to execute each of these operations, the multiplication of two identical large variables being executed by means of a squaring function or "SQUARE" function, whereas the multiplication of two different large variables is executed by means of a multiplication function or "MULT" function. This distinction is due to the fact that it is possible to calculate more rapidly x×y when x=y than in the opposite case, by means of the SQUARE function. The ratio between the execution time of the SQUARE function and the execution time of the MULT function is generally in the order of 0.8 but can vary between 0.5 and 1 depending on the size of the numbers considered, the way the multiplication is executed, etc.

In a smart-card-type electronic device, the cryptographic calculation is generally executed by a specific processor, such as an arithmetic coprocessor or a crypto-processor. The calculation of "$m^d$ modulo n", and more particularly the execution of the multiplications of large numbers, occupies the majority of the calculation time of the processor relative to the total calculation time of a signature, signature check, or ciphering or deciphering operation. Using in turns the SQUARE function or the MULT function according to the type of calculation to be performed thus optimizes the total ciphering, deciphering, signature or signature check calculation time.

However, using two different SQUARE and MULT functions leads to an information leak detectable by Simple Power Analysis (SPA), i.e. by analyzing the current consumption of the card. As the SQUARE function has an execution time shorter than the MULT function, it is possible to differentiate these two operations by observing the current consumption curve of the component. "Current consumption" means any observable physical value that reveals the operation of the electronic component executing the operation, in particular the electric current consumed or the electromagnetic radiation of the component.

Figure 1:
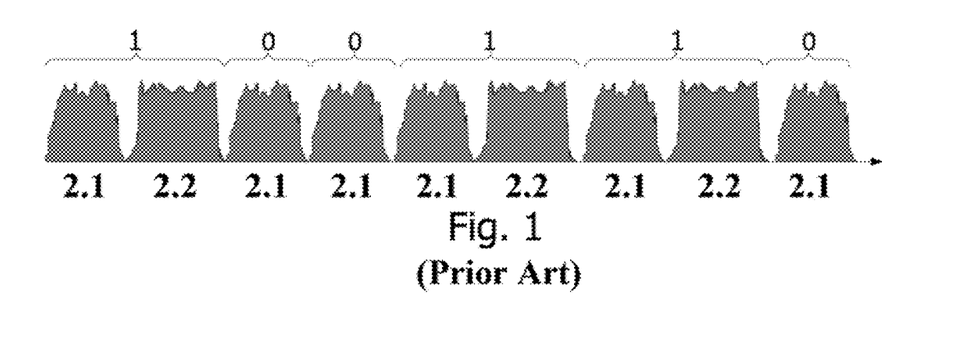
FIG. 1 described above represents the curve of current consumption of a component executing a first classic exponentiation algorithm, FIG. 2 described above represents the curve of current consumption of a component executing a second classic exponentiation algorithm, FIG. 3 described above represents the curve of current consumption of a component executing a third classic exponentiation algorithm.

FIG. 1 represents a curve of current consumption of a component executing the algorithm A1. The consumption profile of the SQUARE function and that of the MULT function can be clearly distinguished. A SQUARE operation followed by a MULT operation (step 2.1 followed by a step 2.2) reveals that the bit of the exponent d is equal to 1 since the conditional branching towards step 2.2 requires that the condition $d_s$=1 be met. Conversely, a SQUARE operation followed by another SQUARE operation (step 2.1 followed by another step 2.1) reveals that the bit of the exponent is equal to 0. The bits of the exponent d can thus be discovered one after the other by a simple observation of the current consumption curve.

To overcome this drawback, steps 2.1 and 2.2 of the algorithms A1 and A1' could be performed by means of the MULT function only, without using the SQUARE function. However, a finer analysis of the current consumption enables step 2.1 to be distinguished from step 2.2 as the algorithm A1 or A1' is not regular. Indeed, in this case, the time elapsing between two successive multiplications is not the same when the two multiplications correspond to the successive execution of two steps 2.1 (bit of the exponent equal to 0) or correspond to the execution of a step 2.1 followed by a step 2.2 (bit of the exponent equal to 1). An attacker could thus "zoom" on the portion of the consumption curve extending between the multiplications and would observe a time asymmetry revealing the conditional branching and thus the value of the bit of the exponent.

The algorithm A2 appearing in Appendix I is a variant of the algorithm A1 which enables this drawback to be overcome. The algorithm A2 is referred to as "Square & Multiply Always" as a dummy multiplication (step 2.3) using a dummy parameter b is inserted after a squaring when the bit of the exponent d is equal to 0, thanks to a double conditional branching "if" and "else".

Figure 2:
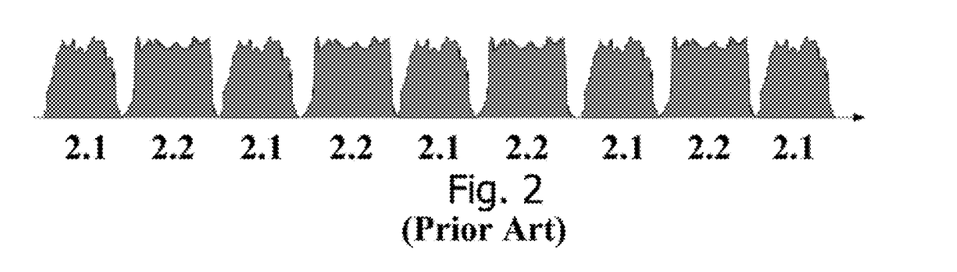

FIG. 2 shows the current consumption of a component executing the algorithm A2. A regularity is seen in the consumption peaks corresponding to the succession of steps 2.1 and 2.2, which protects the algorithm against an SPA attack. It is thus assumed that the double conditional branching "if" and "else" does not result in any leak detectable by SPA, as it is not possible to distinguish whether the condition is true or false, since a multiplication is always executed. The algorithm A2 is said to be "regular" since the attacker sees a succession of identical steps. But it does not meet the atomicity principle.

The atomicity principle was introduced by B. Chevallier-Mames, M. Ciet and M. Joye, in an article entitled "*Low-Cost Solutions for Preventing Simple Side-Channel Analysis: Side-Channel Atomicity*", published in IEEE Transactions on Computers, Volume 53, Issue 6 (June 2004), Pages: 760-768, 2004. It is also described in the international application WO 03 083 645 or the U.S. Pat. No. 7,742,595.

The application of the atomicity principle leads to transforming a non-regular loop, for example the loop formed by steps 2.1 and 2.2 of the algorithm A1 or A1', into a regular series of multiplications, without using any dummy multiplication, in order to save time when executing the algorithm.

As an example, the exponentiation algorithm A3 appearing in Appendix I, referred to as "Multiply Always", is the atomic version of the algorithm A1. The algorithm is perfectly regular in that it only comprises multiplications and in that each iteration of the main loop comprises only a single multiplication.

Figure 3:
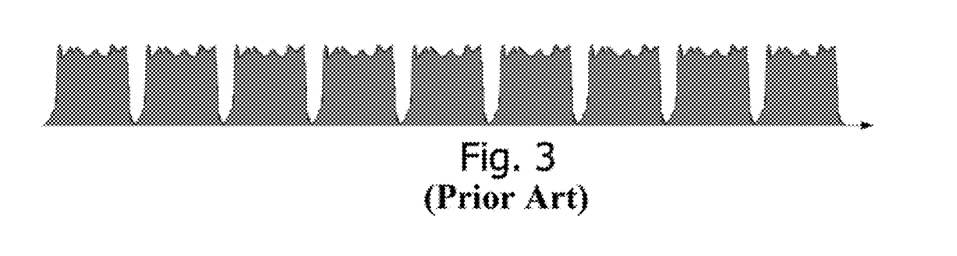

FIG. 3 represents the curve of current consumption of the algorithm A3 and shows the regularity of the peaks of current consumption.

In this algorithm, certain multiplications are multiplications of different variables and others are multiplications of identical variables. Now, in the article "*Distinguishing Multiplications from Squaring Operations*", Selected Areas in Cryptography, volume 5381 of Lecture Notes in Computer Science, pages 346-360, Springer, 2008, the authors F. Amiel, B. Feix, M. Tunstall, C. Whelan, and W. Marnane disclose a side-channel analysis method which uses an intrinsic difference between the multiplication of two different variables and the multiplication of two identical variables (equivalent to a squaring), the result of the second one having on average a Hamming weight lower than the result of the first one. The algorithm A3 is thus exposed to this type of attack, as it contains multiplications of different terms and multiplications of equal terms.

The algorithm A2 "Square & Multiply Always" is not sensitive to this type of attack as the multiplications executed in step 2.2 are all multiplications of different variables, and step 2.1 is executed with the SQUARE function. However, it has the drawback of a non-optimized execution time due to the execution of dummy multiplications. Moreover, there is a class of so-called "safe error" attacks that enable the dummy operations comprised in an algorithm to be detected. These attacks involve injecting a fault into a cryptographic calculation at a particular instant, and observing whether the result of the calculation is right or wrong. This type of attack applied to the algorithm A2 makes it possible to know whether a multiplication is performed after an "if" or after an "else". Indeed, in the second case, the result of the dummy multiplication is not used to calculate the final result. Therefore, an error injection into a loop in which the conditional branching "else" is active does not affect the result and makes it possible to know that the conditional branching "else" was selected rather than the branching "if".

The algorithm A4 appearing in Appendix I, referred to as "Montgomery Ladder", also enables a modular exponentiation calculation to be performed. Upon each iteration, this algorithm involves performing two multiplications, one applied to two different numbers, and the other applied to two identical numbers and thus capable of being performed by a multiplication or a squaring. Upon each iteration, one of the two registers $R_0$, $R_1$ receives the product of the content of the two registers, and the content of the other one is squared. If the bit $d_s$, corresponding to the iteration in progress, of the exponent d is on 0, the register $R_1$ receives the result of the multiplication, and the register $R_0$ is squared, and conversely if the bit $d_s$ is on 1.

This algorithm offers the advantage of being perfectly regular in that each iteration systematically comprises two multiplications, or a multiplication and a squaring. This algorithm is also optimized in terms of calculation time insofar as it does not comprise any dummy operation. This algorithm also offers the advantage of being parallelizable using an additional register. The algorithm A4' appearing in Appendix I is a parallelized variant of the algorithm A4. The algorithm A4' uses an additional register $R_2$ (cf. step 2.2 of the algorithm A4' in Appendix I) so as not to overwrite the operand $R_0$ or $R_1$ of the multiplication, during the squaring operation.

Figure 4A:
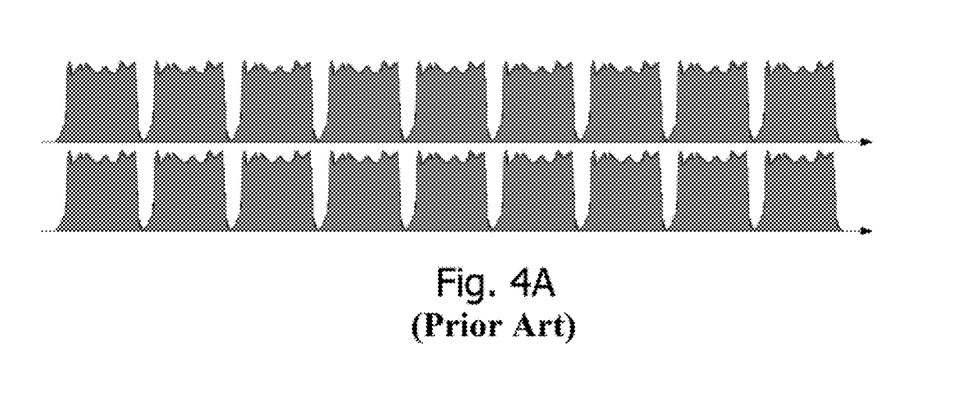
FIGS. 4A, 4B represent curves of current consumption of a component executing two variants of a classic exponentiation algorithm.
Figure 4B:
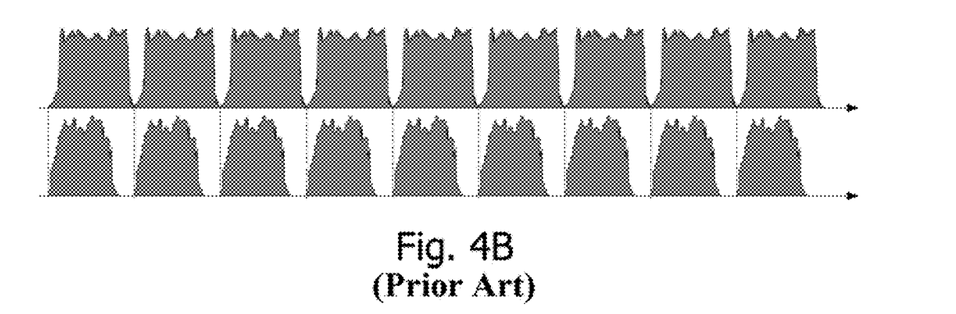

FIGS. 4A and 4B represent curves of current consumption of a component executing the algorithm A4'. These consumption curves show a regularity in the succession of the peaks of current consumption, whether the second multiplication is performed by the MULT function (FIG. 4A) or the SQUARE function (FIG. 4B).

The application EP 2 492 804 (US2012/0221618) filed by the Applicant suggests replacing in the algorithms A1, A1' or A2, the multiplication operations with squaring operations by using one or other of the following formulas:

$$x \times y = [(x+y) \times (x+y) - x \times x - y \times y]/2 \qquad (i)$$

$$x \times y = [(x+y)/2] \times [(x+y)/2] - [(x-y)/2] \times [(x-y)/2] \qquad (ii)$$

The algorithm A5 appearing in Appendix I shows an example of modular exponentiation calculation implementing the formula (ii), from left to right. The operation of this algorithm can be understood with reference to the classic algorithm A1 described above. Two cases can arise:

1) The bit $d_i$ of the exponent is equal to 0:
   the algorithm calculates $R_0=R_0 \times R_0$ (step 3.1), which corresponds to step 2.1 of the algorithm A1.
2) The bit $d_i$ is equal to 1, the algorithm performs three iterations of the "while" loop:
   $R_0=R_0 \times R_0$ (step 3.1), which corresponds to step 2.1 of the algorithm A1)
   $R_2=((R_0+m)/2) \times ((R_0+m)/2)$ (steps 3.3, 3.4, then 3.1)
   $R_0=((R_0-m)/2) \times ((R_0-m)/2)$ and $R_0=R_2-R_0$ (steps 3.2, 3.4, then 3.1), which corresponds to step 2.2 of the algorithm A1 implemented with the formula (ii)).

The profile of current consumption of a component executing the algorithm A5 is in the form of a succession of peaks corresponding to calls to the MULT (or SQUARE) function. Such a consumption curve does not enable the value of the bits of the secret exponent to be deduced and is thus protected from an SPA attack. Furthermore, the attack consisting in distinguishing a multiplication of two different variables from a multiplication of two identical variables is not applicable since the method only comprises multiplications of equal terms.

The execution time per iteration (per bit of the exponent d) of the algorithm A5 can be assessed at twice the calculation time of a squaring, i.e. 1.6 times the calculation time of a multiplication.

A parallelizable variant can be derived from the algorithm A5. Thus, the algorithm A5' appearing in Appendix I shows another example of modular exponentiation calculation implementing the formula (ii), from right to left, in a parallelized, atomic form.

The current consumption profile of a component executing the algorithm A5' is in the form of a double succession of peaks corresponding to calls to the MULT (or SQUARE) function. Such a succession does not enable the bits of the exponent d to be determined.

The execution time of this algorithm depends on the number of registers implemented, and tends toward the calculation time of one square per bit of the exponent d, even if this means using a very large number L of registers of the size of the datum m to be raised to the power of d.

It could thus be desirable to reduce the calculation time and the memory size used by a method for executing an exponentiation calculation applied to a large datum. It could also be desirable to protect such a method from the above-mentioned side-channel attacks, while affecting the calculation time as little as possible.

Some embodiments relate to a method for performing an iterative calculation of exponentiation of a large datum by an exponent formed of a certain number of bits, the method being implemented in an electronic device comprising a calculation block for squaring a large variable, a calculation block for multiplying large variables and a buffer memory for temporarily storing results provided by the squaring circuit, the method comprising steps of: while the buffer memory is not full of results not used by the multiplication block and if the squaring block is inactive, triggering a calculation by the squaring block for each bit of the exponent, and if the bit of the corresponding exponent is on one, storing the result provided by the squaring block in the buffer memory, in association with the value of a group of a certain number of consecutive bits following the bit on one of the exponent, and resetting to zero all the bits of the group in the exponent, while the buffer memory contains a squaring result not used by the multiplication block and if the multiplication block is inactive, triggering a multiplication calculation by the multiplication block for multiplying the unused squaring result by a multiplication result stored for the value of the group associated with the squaring result and storing the result of the multiplication for the value of the group, and combining the multiplication results stored for the groups by raising the multiplication results stored to the power of two times the value of the group plus 1 and by multiplying among themselves the results of the raising operations obtained.

According to one embodiment, the method comprises triggering a dummy calculation by the squaring block, if the buffer memory is full, if the corresponding bit of the exponent is on 1, and if the squaring block is inactive.

According to one embodiment, the method comprises triggering a dummy calculation by the multiplication block if the buffer memory is empty and if the multiplication block is inactive.

According to one embodiment, all the results provided by the squaring and multiplication blocks are used to obtain the result of the exponentiation.

According to one embodiment, several results provided by the squaring block are stored in the buffer memory.

According to one embodiment, the buffer memory is managed in a cyclical manner, with a write index, a read index and a counter of unused results.

According to one embodiment, the buffer memory is configured to store three to five results provided by the squaring block.

According to one embodiment, the calculations performed by the squaring and multiplication blocks are modular operations.

Some embodiments also relate to an electronic device comprising a processor configured to calculate an exponentiation of a large datum by an exponent, a calculation block for squaring a large variable and a calculation block for multiplying large variables.

According to one embodiment, the device comprises a buffer memory capable of storing several results provided by the squaring block, the device being configured to implement the method defined above.

According to one embodiment, the buffer memory is configured to store three to five results provided by the squaring block.

According to one embodiment, the squaring and multiplication blocks each comprise a coprocessor of programmable central unit type, or a fully hardware coprocessor of state machine type, or are each performed by a task executed independently of a main program, the tasks and the main program being executed by the multi-core-type processor.

BRIEF DESCRIPTION OF THE DRAWINGS

Some examples of embodiments of the present invention will be described below in relation with, but not limited to, the following figures, in which.

The present invention relates to a cryptographic calculation method comprising multiplications of identical large variables and multiplications of different large variables. It is implemented by an electronic device configured to execute cryptographic calculations, including exponentiations. The method can be an RSA, DSA, El Gamal, etc. exponentiation calculation.

According to one embodiment, this method is based on a derivation of the algorithm A1', in which the squaring calculations are performed using an optimized multiplication taking into account the equality of the operands, and in which the multiplication and squaring calculations performed upon each iteration are done in parallel and in an asynchronous manner. Thus, a new squaring calculation can be triggered as soon as a previous squaring calculation is complete, without waiting for completion of a multiplication that is possibly being calculated. Similarly, a new multiplication calculation can be triggered as soon as a previous multiplication calculation is complete, without waiting for completion of a squaring that is possibly being calculated. Therefore, the result of a squaring or of a multiplication can be used as soon as it is available.

The algorithm A6 appearing in Appendix II is an example of an exponentiation algorithm, from right to left, according to one embodiment.

In the algorithm A6 and in the algorithms described below:

M(a,b) designates a function of asynchronous calculation of the product of large numbers a and b, S(a) designates a function of asynchronous calculation of the square of the large number a, FinM( ) designates a function providing an indicator on FALSE while a product calculation is in progress (active M function) and changing to TRUE as soon as a product is available (inactive M function), and FinS( ) designates a function providing an indicator on FALSE while a squaring calculation is in progress (active S function) and changing to TRUE as soon as a square is available.

The algorithm A6 uses a set of L registers R of the size of the datum m to be raised to the power of d. This set can advantageously be managed like a buffer memory of cyclical FIFO (First In-First Out) type (steps 3.1.1.1.2 and 3.2.1.2). For this purpose, a counter k stores the number of squares loaded into the registers R, not used by the multiplications. A write index j defines the register R into which the result of the next squaring must be loaded, and a read index i defines the register R in which the operand of the next multiplication is located. In this algorithm, step 3 is a loop control on the number v of bits of the exponent d. Steps 3.1.x are executed when a squaring calculation is complete (FinS=TRUE—step 3.1), and when the buffer memory formed by the registers is not full (k≠L) and when a square must be loaded into a register R ($d_s$=1—step 3.1.1.1). A squaring calculation (step 3.1.1.2) is performed for each bit $d_s$ of the exponent d, but only the results of the squaring operations are loaded into one of the registers R (step 3.1.1.1.1) when the bit $d_s$ of the exponent being processed is equal to 1. Steps 3.2.1.x are executed when a product calculation is complete (FinM=TRUE—step 3.2) and when the buffer memory is not empty (k≠0—step 3.2.1). A product calculation (steps 3.2.1.1 and 4.1.1) is performed for each squaring calculation loaded into a register R. Steps 4.x enable the remaining multiplications to be performed once all the necessary squaring operations have been performed. Steps 5.x form a waiting loop for waiting for the end of the last multiplication or squaring calculation, the last multiplication calculation providing the result of the exponentiation calculation.

The execution time per iteration of this algorithm depends on the number L of registers R used. The higher this number, the lower the probability that all the registers R are full during the execution of the algorithm, and thus the less a squaring calculation is likely to be delayed. From L=3, the execution time per iteration of this algorithm substantially reaches a minimum value equal to the calculation time of a squaring, i.e. about 0.8 times the calculation time of a multiplication. The algorithm A6 thus enables the performances of the algorithm A5' to be reached with much fewer registers of the size of the datum m to be raised to the power of d.

Figure 5:
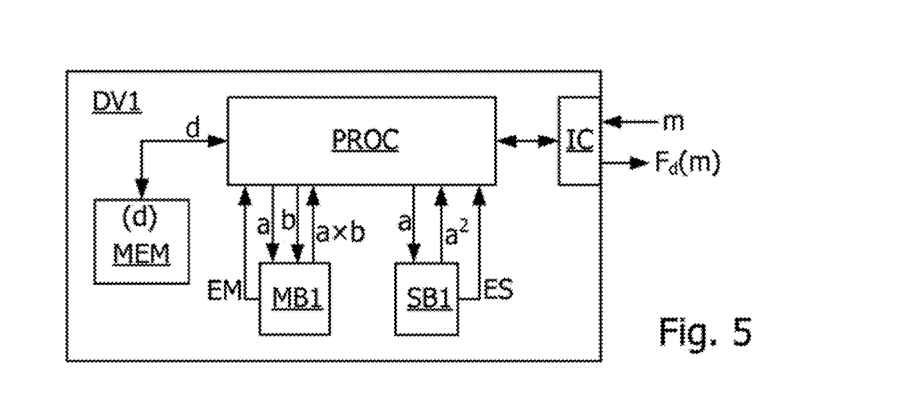
FIG. 5 represents an electronic device implementing an exponentiation algorithm according to one embodiment.

FIG. 5 represents in block diagram form an electronic device DV1 configured to execute a cryptographic calculation including the algorithm A6. The device DV1 can be an integrated circuit on a semiconductor chip arranged on a portable medium like a plastic card, the assembly forming a smart card. The device DV1 can also be any appliance equipped with a multi-task processor, such as a smartphone, a multimedia player, a tactile tablet or a personal computer. The device DV1 can also be a component of such an appliance, for example linked to a main processor of the appliance.

The device DV1 comprises a processor PROC, a calculation block MB1 configured to execute the function M(a,b) for multiplying large variables a, b, a calculation block SB1 configured to execute the function S(a) for squaring a large variable a, a memory MEM and a communication interface circuit IC. The interface circuit IC can be of the contact or contactless type, for example an RF or UHF interface circuit operating by inductive coupling or by electrical coupling. The calculation blocks MB1, SB1 can each comprise a coprocessor equipped with a programmable central unit, an entirely hardware coprocessor of state machine type, or an execution task or thread executed independently of a main program, in particular by a multi-core processor. The two calculation blocks MB1, SB1 can be integrated into a same component (coprocessor or state machine) if they can operate independently of each other.

In a manner that is classical per se, a variable is said to be "large" when its size (in number of bits) is greater than that of the calculation registers of the processor PROC. The latter itself performs, without using the calculation blocks MB1, SB1, multiplications of small variables, i.e. the size of which is lower than or equal to that of its calculation registers, and uses the calculation blocks MB1, SB1 for the multiplication and squaring of large variables, i.e. greater than the size of its calculation registers. For example, if the size of the calculation registers of the processor PROC is 32 bits, a large variable is a variable greater than 32 bits. In cryptography, the variables handled can reach several hundred or several thousand bits (512; 1.024; 2,048; 4,096 bits).

The memory MEM is coupled to the processor PROC and enables the device DV1 to store a secret key d. The processor PROC receives, through the interface circuit IC, a message m to be ciphered or to be signed, and returns a ciphered message or a signature of the $F_d(m)$ type, F being a cryptographic function based on the key d comprising an exponentiation calculation of $m^d$ modulo(n) type executed by means of the algorithm A6. During the exponentiation calculation, the processor PROC uses the calculation blocks MB1, SB1, by providing variables a, b to the calculation block MB1 which returns a×b, and by providing a variable a to the calculation block SB1 which returns $a^2$. The block MB1 supplies a signal EM in a state that is for example active when a multiplication result is available, and in an inactive state when it is calculating a product. Similarly, the block SB1 supplies a signal ES in a state that is for example active when a square is available, and in an inactive state when it is performing a squaring. A portion of the memory MEM can also be used as buffer memory to store the content of the registers R mentioned in the algorithm A6.

Figure 6:
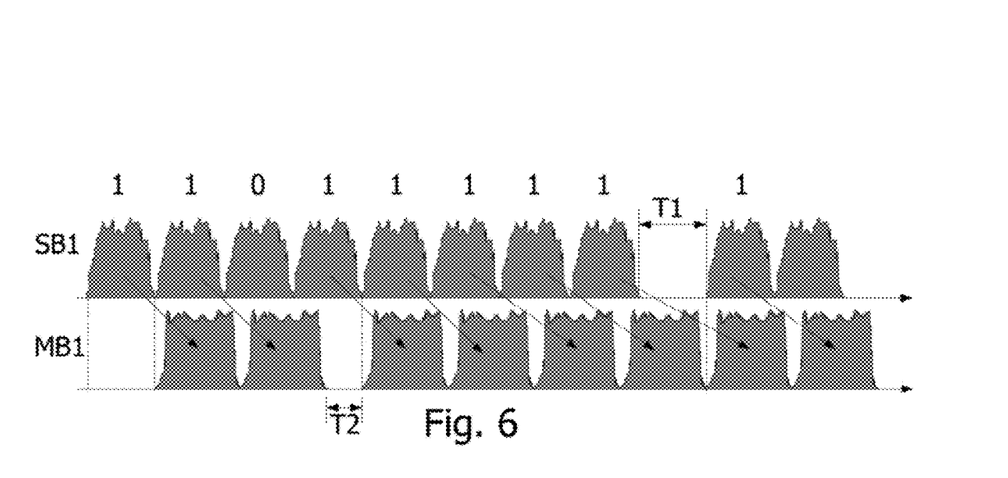
FIGS. 6 and 7 represent curves of current consumption of the electronic device executing two embodiments of an exponentiation algorithm.
Figure 7:
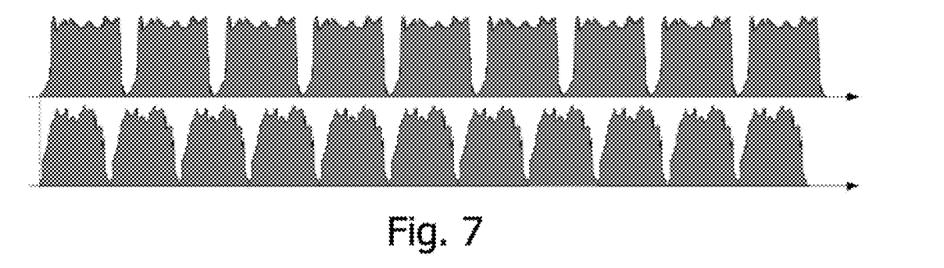

FIG. 6 represents a current consumption profile of a component such as the device DV1, executing the algorithm A6. This current consumption profile is in the form of a double succession of peaks corresponding to the respective activity of the blocks SB1 and MB1, i.e. to the calls to the M( ) and S( ) functions. At the start of the execution of the algorithm A6, no call to the function M( ) can be made while the function S( ) has not provided any result stored in a register R, i.e. for a bit $d_s$ equal to 1 of the exponent d. The activity of the block SB1 comprises periods T1 during which the block is inactive. These periods correspond to the periods during which the buffer memory R[L] is full (of squaring results not used by a previous multiplication) and a squaring result must be loaded into this buffer memory ($d_s$=1—condition of the step 3.1.1. not met). The activity of the block MB1 also comprises periods T2 during which the block is inactive. These periods correspond to the periods during which the buffer memory R[L] is empty (does not contain any squaring result not used by a previous multiplication). An analysis of the activity of the blocks SB1, MB1 can therefore enable the value of the exponent d to be determined. As a result, the algorithm A6 is vulnerable to SPA attacks. However, the analysis of this activity to deduce the exponent d can be rendered more difficult by increasing the number L of registers R.

The algorithm A7 appearing in Appendix II is another example of an exponentiation algorithm, from right to left, according to one embodiment. This algorithm, which can be implemented in the device DV1, differs from the algorithm A6 in that it comprises dummy operations enabling the SPA attacks to be neutralized. These dummy operations appear in steps 3.1.2.1 and 3.2.2.1 where the result S(b) of a dummy squaring and the result M(a,b) of a dummy multiplication are loaded into any register x. The result is that the profiles of current consumption of the blocks SB1, MB1 no longer have any periods of inactivity T1, T2. These profiles do not therefore enable the bits of the exponent d to be determined. However, this result is obtained at the cost of adding dummy operations and thus increasing the execution time of the exponentiation. Here again, an increase in the number L of registers R can reduce the number of dummy operations to be executed, in particular the number of dummy squaring operations.

The algorithm A8 appearing in Appendix II is an atomized version, according to one embodiment, of the algorithm A7.

This algorithm which can also be implemented in the device DV1, differs from the algorithm A7 in that all the conditional branchings have been replaced with a binary matrix $Q_L$ of 4(L+1) rows and 3 columns (L being the number of registers R), which defines the operations to be performed upon each iteration. Furthermore, steps 4.x have been integrated into the loop formed by steps 3.x, the loop end test (step 3) being modified so as to include the case processed by steps 4.x of the algorithm A6 or A7, i.e. when a squaring has been performed for each of the bits of the exponent d and when squares not used by the multiplications remain in the registers R. The algorithm A8 calculates at step 3.3 a row index g for reading the matrix $Q_L$ using a pos(x) function which returns 1 if x>0 and else 0. The value of the row index g depends on the number s of the bit $d_s$ being processed of the exponent d, on the value of this bit $d_s$, on the number k of unused squares in the registers R, and on the number L of registers R. This algorithm also uses two pairs of registers a[0], a[1], b[0], b[1] to replace the registers a and b, the registers a[0] and b[0] being provided for receiving the result of the dummy squaring and multiplication calculations, and the registers a[1] and b[1] the results of the non-dummy calculations.

It can be noted that the algorithm A8 continues to perform squaring operations once all the bits $d_s$ of the exponent d have been processed, while unused squares remain in the registers R. However, these additional squaring operations do not adversely affect the total execution time of the exponentiation calculation given that they are performed at the same time as multiplications required for the exponentiation calculation.

The content of the matrix $Q_L$ depends on the calculation mode for calculating the row index g calculated in step 3.3. In the example of the calculation of the row index g performed in step 3.3 of the algorithm A8, the content and the size of the matrix $Q_L$ depend on the value of the number L of registers R. Appendix III provides the values of the matrix $Q_L$ for L equal to 1, 2 and 3. The matrix $Q_2$ (L=2) is built from the matrix $Q_1$ (L=1) by adding to the latter, on the third row starting from the first and last rows of the matrix, the two blocks of two rows (0,1,1/1,1,1) and (0,0,1/0,0,1) indicated in bold in the matrix $Q_2$ provided in Appendix Ill. The matrix $Q_3$ is built from the matrix $Q_2$ by duplicating the blocks of two rows added in the matrix $Q_2$, on the third row starting from the first row and the last row. The rows thus added are indicated in bold in the matrix $Q_3$ provided in Appendix Ill. Similarly, the matrix $Q_L$ (L>1) is built by adding to the third row starting from the first and last rows of the matrix $Q_1$, respectively (L−1) times the two blocks (0,1,1/1,1,1) and (0,0,1/0,0,1).

Other formulas for calculating the row index in order to read the matrix $Q_L$ can be easily imagined. Thus, if the index g (at step 1) is set such that $g=4*(1-d_s)+d_s+2$ ($=6-3d_s$), and if, for the calculation of the following indices g, the following formula is chosen:

$$g=\text{pos}(v-s)*[4*(1-d_s)+d_s+2*\text{pos}(L-k)]+\text{pos}(k) \quad (1)$$

then the matrix referenced Q, provided in Appendix IV is obtained. It can be noted that the matrix Q is independent of the number L of registers R and has a fixed size of 8 rows and 3 columns.

The algorithm A9 appearing in Appendix II is a version derived from the algorithm A6 with application of a sliding window of 2 bits to the exponent d, according to one embodiment. In other words, the algorithm A9 is obtained by modifying the algorithm A6 so as to process upon each iteration two consecutive bits of the exponent d rather than one. More precisely, the algorithm A9 performs a single multiplication per group of two consecutive bits of the exponent d starting with a bit on 1, and finally performs one squaring and two multiplications.

The algorithm A9 can be easily adapted to the algorithm A7 or A8. Thus, the algorithm A10 is derived from the algorithm A9 by adding to it steps 3.1.2, 3.1.2.1, 3.2.2 and 3.2.2.1 of performing a dummy square or multiplication calculation when the square or multiplication calculation circuit is not used and when no square or multiplication calculation is pending.

The algorithm A9 can be easily modified to process the bits of the exponent d by groups of more than two bits. Thus, the algorithm A11 is derived from the algorithm A9 to implement a sliding window of w bits in width. This algorithm uses a table of $2^{w-1}$ registers to receive the products resulting from the multiplications according to the values of the groups of bits of the exponent encountered. The algorithm A11 performs a single multiplication per group of consecutive bits starting with a bit on 1. Several squaring operations and several multiplications will be necessary at the end of the algorithm to determine the result of the exponentiation. For this purpose, each product obtained according to a group value is raised to the power of two times the value of the group plus 1, and the results of the raising operations are multiplied along themselves to obtain the result of the exponentiation. This can therefore result in a reduction in the number of multiplications of large numbers, in particular when the groups of bits of the exponent considered contain several bits on 1. This reduction in the number of multiplications requires using $2^{w-1}$ additional large registers, w being the number of bits per group of bits of the exponent.

It will be understood that a version robust to SPA attacks of the algorithm A11 can be derived in a similar manner from one or other of the algorithms A7 and A8.

The result of the exponentiation calculation provided by the processor PROC can be modular or non-modular. The device DV1 represented in FIG. 5 performs non-modular exponentiation operations. The blocks MB1 and SB1 of the device DV1 perform non-modular squaring and multiplication operations. Furthermore, it can be noted that the algorithms A6, A7, A8 do not need to be modified to obtain a modular or non-modular exponentiation result, and only the calculation blocks MB1 and SB1 need to be adapted for this purpose.

Figure 8:
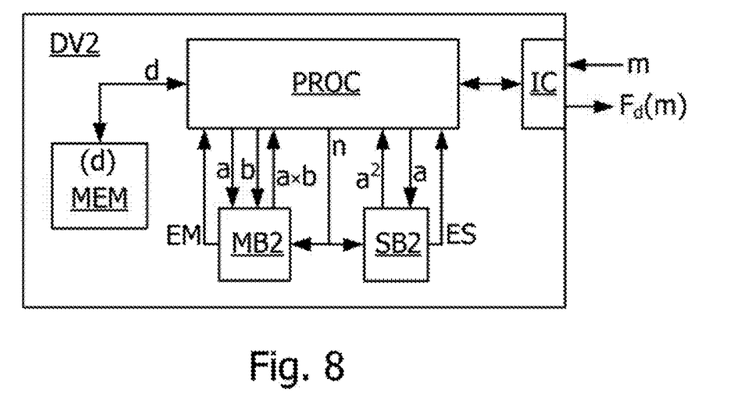
FIG. 8 represents an electronic device implementing an exponentiation algorithm according to another embodiment.

FIG. 8 represents a device DV2 performing modular exponentiations. For this purpose, the device DV2 differs from the device DV1 in that it comprises multiplication MB2 and squaring SB2 blocks performing modular calculations. The blocks MB2, SB2 comprise an additional input to receive the modulus n of the modular calculations. The processor PROC is then configured to provide the blocks MB2, SB2 with a value of the modulus n. The message m to be raised to the power of d is then lower than the modulus n.

The execution time per bit of the exponent d and the number of registers used for each of the algorithms A1 to A8 previously presented are grouped together in the following table 1:

TABLE 1

| Algorithm | Secured SPA | Execution time per bit of the exponent d | Number of registers |
| --- | --- | --- | --- |
| A1, A1' | NO | = 1 S + 0.5 M = 1.30 M | 2 |
| A2 | YES | = 1 S + 1 M = 1.80 M | 2 |
| A3 | YES | = 1.5 M | 2 |
| A4 | YES | = 1 M + 1 S = 1.80 M | 2 |

TABLE 1-continued

| Algorithm | Secured SPA | Execution time per bit of the exponent d | Number of registers |
|---|---|---|---|
| A4' | YES | = 1 M | 3 |
| A5 | YES | = 2 S = 1.60 M | 3 |
| A5' | YES | = 7/6 S = 0.93 M | 5 (L = 1) |
| A5' | YES | = 15/14 S = 0.86 M | 7 (L = 3) |
| A6 | NO | = 0.80 M | 3 (L = 1) |
| A7 | YES | = 0.84 M | 4 (L = 1) |
| A7 | YES | = 0.80 M | 6 (L = 3) |
| A8 | YES | = 0.84 M | 5 (L = 1) |
| A8 | YES | = 0.80 M | 7 (L = 3) |

It emerges from Table 1 that only the algorithms A5' to A8 reach a calculation time per bit of the exponent lower than the calculation time M of a multiplication of large numbers. Furthermore, the algorithms A6, A7 and A8 enable a calculation time substantially equal to that of a squaring of a large number (S≈0.8M) per bit of the exponent d to be reached, with a number of registers significantly lower than the algorithm A5'.

It will be understood by those skilled in the art that the present invention is susceptible of various alternative embodiments and various applications. Dummy multiplications, in particular when starting an exponentiation calculation, can particularly be performed without performing any dummy squaring operations (removal of steps 3.1.2 and 3.1.2.1 from the algorithm A7). Conversely, dummy squaring operations can be performed without performing any dummy multiplications (removal of steps 3.2.2, and 3.2.2.1 from the algorithm A7). Other management modes for managing the registers R(L) can be implemented in the algorithms A6, A7 and A8. For example, these registers can be used by providing steps such as 2.1.1.4, 2.1.2.3 and 2.2.2.1 of the algorithm A5', to shift the content of these registers.

APPENDIX I

Being an Integral Part of the Description

---

Algorithm A1 - "Square & Multiply"
exponentiation, from left to right

Input: a whole message m and a whole modulus n such that m < n
       a whole exponent d of v bits such that d = $(d_{v-1} d_{v-2} \ldots d_0)_2$
Requires: a register a of the size of the message m
Output: $m^d$ modulo n
Step 1: a = 1
Step 2: for s ranging from v−1 to 0 do:
    Step 2.1: a = $(a^2)$ mod n           (SQUARE)
    Step 2.2: if $d_s$ = 1 then a = (a×m) mod n   (MULT)
Step 3: Return a

---

Algorithm A1' - "Square & Multiply"
exponentiation, from right to left

Input: a whole message m and a whole modulus n such that m < n
       a whole exponent d of v bits such that d = $(d_{v-1} d_{v-2} \ldots d_0)_2$
Requires: two registers a and b of the size of the message m
Output: $m^d$ modulo n
Step 1: a = 1; b = m
Step 2: for s ranging from 0 to v−1 do:
    Step 2.1: if $d_s$ = 1 then a = (a×b) mod n   (MULT)
    Step 2.2: b = $(b^2)$ mod n           (SQUARE)
Step 3: Return a

---

Algorithm A2 - "Square & Multiply Always"
exponentiation, from left to right

Input: a whole message m and a whole modulus n such that m < n
       a whole exponent d of v bits such that d = $(d_{v-1} d_{v-2} \ldots d_0)_2$
Requires: two registers a and b of the size of the message m
Output: $m^d$ modulo n
Step 1: a = 1, b = 1
Step 2: for s ranging from v−1 to 0 do:
    Step 2.1: a = $(a^2)$ mod n           (SQUARE)
    Step 2.2: if $d_{v-s}$ = 1 then a = (a×m) mod n  (MULT)
    Step 2.3: else b = (a×m) mod n        (MULT)
Step 3: Return a

---

Algorithm A3 - "Multiply Always",
from left to right, atomic version

Input: a whole message m and a whole modulus n such that m < n
       a whole exponent d of v bits such that d = $(d_{v-1} d_{v-2} \ldots d_0)_2$
Requires: two registers $R_0$ and $R_1$ of the size of the message m
Output: $m^d$ modulo n
Step 1: $R_0$ = 1, $R_1$ = m, s = v−1, k = 0
Step 2: while s ≥ 0 do:
    Step 2.1: $R_0 = R_0 \times R_k$ mod n       (MULT)
    Step 2.2: k = k Å $d_s$; s = s−1+k
Step 3: Return $R_0$

---

The operation "aÅb" designates the Exclusive OR bit by bit of the variables a and b.

---

Algorithm A4 - Montgomery Ladder (from left to right)

Input: a whole message m and a whole modulus n such that m < n
       a whole exponent d of v bits such that d = $(d_{v-1} d_{v-2} \ldots d_0)_2$
Requires: two registers $R_0$ and $R_1$ of the size of the message m
Output: $m^d$ modulo n
Step 1: $R_0$ = 1, $R_1$ = m
Step 2: for s ranging from v−1 to 0 do:
    Step 2.1: b = $d_s$
    Step 2.2: $R_{1-b} = R_0 \times R_1$ mod n     (MULT)
    Step 2.3: $R_b = (R_b)^2$ mod n       (SQUARE)
Step 3: Return $R_0$

---

Algorithm A4' - Montgomery Ladder, parallelized version

Input: a whole message m and a whole modulus n such that m < n
       a whole exponent d of v bits such that d = $(d_{v-1} d_{v-2} \ldots d_0)_2$
Requires: three registers $R_0$, $R_1$ and $R_2$ of the size of the message m
Output: $m^d$ modulo n
Step 1: $R_0$ = 1, $R_1$ = m
Step 2: for s ranging from v−1 to 0 do:
    Step 2.1: b = $d_s$
    Step 2.2: $R_{1-b} = R_0 \times R_1$ mod n ∥ $R_2 = (R_b)^2$ mod n
    (MULT∥SQUARE)
    Step 2.3: $R_b = R_2$
Step 3: Return $R_0$

---

(the symbol ∥ separates operations performed in parallel)

---

Algorithm A5 - "Square always" with (ii), from left to right.

Input: a whole message m and a whole modulus n such that m < n
       a whole exponent d of v bits such that d = $(d_{v-1} d_{v-2} \ldots d_0)_2$
Requires: three registers $R_0$, $R_1$, $R_2$ of the size of the message m
Output: $m^d$ modulo n
Step 1: $R_0$ = 1; $R_1$ = m mod n; $R_2$ = 1
Step 2: u = 0; s = 2; w = 2; t = 0; i = v−1; j = 1

| Algorithm A5 - "Square always" with (ii), from left to right. |
| --- |
| Step 3: while i ³ 0 do:<br>   Step 3.1: $R_u = (R_u)^2$ mod n          (SQUARE)<br>   Step 3.2: if w = 0 then $R_w = (R_t - R_j)$ mod n<br>   Step 3.3: else $R_w = (R_t + R_j)$ mod n<br>   Step 3.4: $R_s = R_s/2$ mod n<br>   Step 3.5: t = u; j = (t+1) mod 3; u = w*$d_i$<br>   Step 3.6: s = (u+2) mod 4; w – tÅs<br>   Step 3.7: i = i−(w>>1)<br>Step 4: Return $R_0$ |

The operation a>>b designates the right shift of the variable a by b bits.
The operation a*b designates the multiplication of small variables, that is executed without using any multiplication or squaring block.

| Algorithm A5' - "Square always" with (ii), from right to left, parallelized |
| --- |
| Input: a whole message m and a whole modulus n such that m < n<br>        a whole exponent d of v bits such that d = $(d_{v-1} d_{v-2} .... d_0)_2$<br>Requires: L+4 registers of the size of the message m: a, $R_0$, $R_1$, ... $R_{L+2}$<br>Output: $m^d$ modulo n<br>Step 1: a = 1; $R_1$ = m; k = 0<br>Step 2: for s ranging from 0 to v−1 do:<br>   Step 2.1: if $d_s$ = 1 then<br>      Step 2.1.1: if k < L then<br>         Step 2.1.1.1: $R_0 = (a-R_1)^2$ mod n‖ $R_{k+2} = (R_{k+1})^2$ mod n<br>         Step 2.1.1.2: a = $(a+R_1)^2$ mod n ‖ $R_{k+3} = (R_{k+2})^2$ mod n<br>         Step 2.1.1.3: a = $(a-R_0)/4$ mod n<br>         Step 2.1.1.4: $(R_1, R_2, ... R_{L+1}) = (R_2, R_3, ... R_{L+2})$<br>         Step 2.1.1.5: k = k+1<br>      Step 2.1.2: else<br>         Step 2.1.2.1: $R_0 = (a-R1)^2$ mod n ‖ a = $(a+R_1)^2$ mod n<br>         Step 2.1.2.2: a = $(a-R_0)/4$ mod n<br>         Step 2.1.2.3: $(R_1, R_2, ... R_{L+1}) = (R_2, R_3, ... R_{L+2})$<br>         Step 2.1.2.4: k = k−1<br>   Step 2.2: else<br>      Step 2.2.1: if k = 0 then<br>         Step 2.2.1.1: $R_1 = (R_1)^2$ mod n<br>      Step 2.2.2: else<br>         Step 2.2.2.1: $(R_1, R_2, ... R_{L+1}) = (R_2, R_3, ... R_{L+2})$<br>         Step 2.2.2.2: k = k−1<br>Step 3: Return a |

APPENDIX II

Being an Integral Part of the Description

| Algorithm A6 - "Square & Multiply", parallelized, from right to left |
| --- |
| Input: a whole message m<br>        a whole exponent d of v bits such that d = $(d_{v-1} d_{v-2} .... d_0)_2$<br>Requires: two registers a and b of the size of the message m, and<br>        L registers R of the size of the message m: R[0] to R[L−1], with L ≥ 1<br>Output: $m^d$<br>Step 1: a = 1; b = m; s = 0<br>Step 2: i,j,k = 0,0,0<br>Step 3: While s < v do:<br>   Step 3.1: If FinS( ) then:<br>      Step 3.1.1: If $d_s$ = 0 OR k ≠ L then:<br>         Step 3.1.1.1: If $d_s$ = 1<br>            Step 3.1.1.1.1: R[j] = b<br>            Step 3.1.1.1.2: j = j+1 mod L<br>            Step 3.1.1.1.3: k = k+1<br>         Step 3.1.1.2: b = S(b)         (SQUARE)<br>         Step 3.1.1.3: s = s+1 |

| Algorithm A6 - "Square & Multiply", parallelized, from right to left |
| --- |
| Step 3.2: If FinM( ) then:<br>   Step 3.2.1: If k ≠ 0 then:<br>      Step 3.2.1.1: a =         (MULT)<br>      M(a,R[i])<br>      Step 3.2.1.2: i = i+1 mod L<br>      Step 3.2.1.3: k = k−1<br>Step 4: While k ≠ 0 do:<br>   Step 4.1: If FinM( ) then:<br>      Step 4.1.1: a = M(a,R[i])         (MULT)<br>      Step 4.1.2: i = i+1 mod L<br>      Step 4.1.3: k = k−1<br>Step 5: While FinS( ) = FALSE OR FinM( ) = FALSE do:<br>   Step 5.1: NOTHING<br>Step 6: Return a |

| Algorithm A7 - "Square & Multiply", parallelized, from right to left, with dummy operations |
| --- |
| Input: a whole message m<br>        a whole exponent d of v bits such that d = $(d_{v-1} d_{v-2} .... d_0)_2$<br>Requires: three registers a, b and x of the size of the message m, and<br>        L registers R of the size of the message m: R[0] to R[L−1], with L ≥ 1<br>Output: $m^d$<br>Step 1: a = 1; b = m; s = 0<br>Step 2: i,j,k = 0,0,0<br>Step 3: While s < v do:<br>   Step 3.1: If FinS( ) then:<br>      Step 3.1.1: if $d_s$ = 0 OR k ≠ L then:<br>         Step 3.1.1.1: If $d_s$ = 1<br>            Step 3.1.1.1.1: R[j] = b<br>            Step 3.1.1.1.2: j = j+1 mod L<br>            Step 3.1.1.1.3: k = k+1<br>         Step 3.1.1.2: b = S(b)         (SQUARE)<br>         Step 3.1.1.3: s = s+1<br>      Step 3.1.2: Else do:<br>         Step 3.1.2.1: x = S(b)<br>   Step 3.2: If FinM( ) then:<br>      Step 3.2.1: If k ≠ 0 then:<br>         Step 3.2.1.1: a = M(a,R[i])<br>         Step 3.2.1.2: i = i+1 mod L<br>         Step 3.2.1.3: k = k−1<br>      Step 3.2.2: Else do:<br>         Step 3.2.2.1: x =         (MULT)<br>        M(a,R[i])<br>Step 4: While k ≠ 0 do:<br>   Step 4.1: If FinM( ) then:<br>      Step 4.1.1: a = M(a,R[i])         (MULT)<br>      Step 4.1.2: i = i+1 mod L<br>      Step 4.1.3: k = k−1<br>Step 5: While FinS( ) = FALSE OR FinM( ) = FALSE do:<br>   Step 5.1: NOTHING<br>Step 6: Return a |

| Algorithm A8 - "Square & Multiply", parallelized, from right to left, atomic version |
| --- |
| Input: a whole message m<br>        a whole exponent d of v bits such that d = $(d_{v-1} d_{v-2} .... d_0)_2$<br>Requires: L registers of the size of the message m: R[0] to R[L−1], with L ≥ 1<br>        2 registers of the size of the message m: a[0] and a[1]<br>        2 registers of the size of the message m: b[0] and b[1]<br>        a matrix $Q_L$ of 4(L+1) rows and 3 columns of bits<br>Output: $m^d$<br>Step 1: a[1] = 1; b[1] = m; s = 0; g = $d_s$<br>Step 2: i,j,k = 0,0,0<br>Step 3: While s < v or k ≠ 0 do:<br>   Step 3.1: If FinS( ) then:<br>      Step 3.1.1: R[j] = $Q_L[g,0]$*b[1] + (1−$Q_L[g,0]$)*R[j] |

| Algorithm A8 - "Square & Multiply", parallelized, from right to left, atomic version |
|---|

Step 3.1.2: j = j+$Q_L$[g,0] mod L
Step 3.1.3: k = k+$Q_L$[g,0]
Step 3.1.4: b[$Q_L$[g,1]] =     (SQUARE)
  S(b[1])
Step 3.1.5: s = s+$Q_L$[g,1]
Step 3.2: If FinM( ) then:
  Step 3.2.1: a[$Q_L$[g,2]] =     (MULT)
  M(a[1],R[i])

| Algorithm A8 - "Square & Multiply", parallelized, from right to left, atomic version |
|---|

Step 3.2.2: i = i+$Q_L$[g,2] mod L
  Step 3.2.3: k = k−$Q_L$[g,2]
Step 3.3: g = (1−pos(v−s))*2(L+1) + 2*k + pos(v−s)*$d_s$
Step 4: While FinS( ) = FALSE OR FinM( ) = FALSE do:
  Step 4.1: NOTHING
Step 5: Return a[1]

| Algorithm A9 - "Square & Multiply", parallelized, from right to left, with sliding window of 2 bits |
|---|

Input: a whole message m
    a whole exponent d of v+1 bits such that d = (0 $d_{v−1}$ $d_{v−2}$.... $d_0$)$_2$
    (with $d_v$=0)
Requires: three registers a[0], a[1] and b of the size of the message m, and
    L registers R of the size of the message m: R[0] to R[L−1], with L ≥ 1
    H a table of L bits
Output: $m^d$
Step 1: a[0] = 1; a[1] = 1; b = m; s = 0
Step 2: i,j,k = 0,0,0
Step 3: While s < v do:
  Step 3.1: If FinS( ) then:
    Step 3.1.1: If $d_s$ = 0 OR k ≠ L then:
      Step 3.1.1.1: If $d_s$ = 1
        Step 3.1.1.1.1: R[j] = b
        Step 3.1.1.1.2: H[j] = $d_{s+1}$
        Step 3.1.1.1.3: j = j+1 mod L
        Step 3.1.1.1.4: k = k+1
        Step 3.1.1.1.5: $d_{s+1}$ = 0
      Step 3.1.1.2: b = S(b)     (SQUARE)
    Step 3.1.1.3: s = s+1
  Step 3.2: If FinM( ) then:
    Step 3.2.1: If k ≠ 0 then:
      Step 3.2.1.1: a[H[i]] = M(a[H[i]],R[i])     (MULT)
      Step 3.2.1.2: i = i+1 mod L
      Step 3.2.1.3: k = k−1
Step 4: While k ≠ 0 do:
  Step 4.1: If FinM( ) then:
    Step 4.1.1: a[H[i]] = M(a[H[i]],R[i])     (MULT)
    Step 4.1.2: i = i+1 mod L
    Step 4.1.3: k = k−1
Step 5: While FinS( ) = FALSE OR FinM( ) = FALSE do:
  Step 5.1: NOTHING
Step 6: b = S(a[1])     (SQUARE)     // calculation of a[1]$^2$
Step 7: b = M(a[1],b)     (MULT)     // calculation of a[1]$^3$
Step 8: Return M(a[0],b)     (MULT)     // result = a[0]×a[1]$^3$

| Algorithm A10 - "Square & Multiply", parallelized, from right to left, with sliding window of 2 bits, with dummy operations |
|---|

Input: a whole message m
    a whole exponent d of v+1 bits such that d = (0 $d_{v−1}$ $d_{v−2}$.... $d_0$)$_2$
    (with $d_v$=0)
Requires: four registers a[0], a[1], b and x of the size of the message m, and
    L registers R of the size of the message m: R[0] to R[L−1], with L ≥ 1
    H a table of L bits
Output: $m^d$
Step 1: a[0] = 1; a[1] = 1; b = m; s = 0
Step 2: i,j,k = 0,0,0
Step 3: While s < v do:
  Step 3.1: If FinS( ) then:
    Step 3.1.1: If $d_s$ = 0 OR k ≠ L then:
      Step 3.1.1.1: If $d_s$ = 1
        Step 3.1.1.1.1: R[j] = b
        Step 3.1.1.1.2: H[j] = $d_{s+1}$
        Step 3.1.1.1.3: j = j+1 mod L
        Step 3.1.1.1.4: k = k+1
        Step 3.1.1.1.5: $d_{s+1}$ = 0

| Algorithm A10 - "Square & Multiply", parallelized, from right to left, with sliding window of 2 bits, with dummy operations |
| --- |

```
        Step 3.1.1.2: b = S(b)              (SQUARE)
        Step 3.1.1.3: s = s+1
    Step 3.1.2: Else do:
        Step 3.1.2.1: x = S(b)
    Step 3.2: If FinM( ) then:
        Step 3.2.1: If k ≠ 0 then:
            Step 3.2.1.1: a[H[i]] = M(a[H[i]], R[i])     (MULT)
            Step 3.2.1.2: i = i+1 mod L
            Step 3.2.1.3: k = k−1
        Step 3.2.2: Else do:
            Step 3.2.2.1: x = a[H[i]] = M(a[H[i]], R[i]) (MULT)
Step 4: While k ≠ 0 do:
    Step 4.1: If FinM( ) then:
        Step 4.1.1: a[H[i]] = M(a[H[i]],R[i])    (MULT)
        Step 4.1.2: i = i+1 mod L
        Step 4.1.3: k = k−1
Step 5: While FinS( ) = FALSE OR FinM( ) = FALSE do:
    Step 5.1: NOTHING
Step 6: b = S(a[1])         (SQUARE)      // calculation of a[1]²
Step 7: b = M(a[1],b)       (MULT)        // calculation of a[1]³
Step 8: Return M(a[0],b)    (MULT)        // result = a[0]×a[1]³
```

| Algorithm A11 - "Square & Multiply", parallelized, from right to left with sliding window of w bits |
| --- |

```
Input: a whole message m
       a whole exponent d of v+w−1 bits such that d = (0...0 d_{v−1}
       d_{v−2}.... d_0)_2
       (with d_v = 0)
Requires: 2^{w−1} registers a[0], a[1], ..., a[2^{w−1}−1] and a register b, of the
size of the message m, and
          L registers R of the size of the message m: R[0] to R[L−1],
with L ≥ 1
          H a table of L numbers of w−1 bits
Output: m^d
Step 1: For i from 0 to 2^{w−1} do:
    Step 1.1: a[i] = 1
Step 2: b = m; s = 0
Step 3: i,j,k = 0,0,0
Step 4: While s < v do:
    Step 4.1: If FinS( ) then:
        Step 4.1.1: If d_s = 0 OR k ≠ L then:
            Step 4.1.1.1: If d_s = 1 then:
                Step 4.1.1.1.1: R[j] = b
                Step 4.1.1.1.2: H[j] = (d_{s+w−1} ... d_{s+1})_2
                Step 4.1.1.1.3: j = j+1 mod L
                Step 4.1.1.1.4: (d_{s+w−1} ... d_{s+1})_2 = (0 ... 0)
                Step 4.1.1.1.5: k = k+1
            Step 4.1.1.2: b = S(b)          (SQUARE)
            Step 4.1.1.3: s = s+1
    Step 4.2: if FinM( ) then:
        Step 4.2.1: If k ≠ 0 then:
            Step 4.2.1.1: a[H[i]] =         (MULT)
            M(a[H[i]], R[i])
            Step 4.2.1.2: i = i+1 mod L
            Step 4.2.1.3: k = k−1
Step 5: While k ≠ 0 do:
    Step 5.1: If FinM( ) then:
        Step 5.1.1: a[H[i]] =               (MULT)
        M(a[H[i]],R[i])
        Step 5.1.2: i = i+1 mod L
        Step 5.1.3: k = k−1
Step 6: While FinS( ) = FALSE OR FinM( ) = FALSE do:
    Step 6.1: NOTHING
Step 7: For i from 1 to 2^{w−1} −1 do:
    Step 7.1: b = 1
    Step 7.2: k = 2i+1; s = w−1
    Step 7.3: While s >=0 do:        // (b = a[i]^{2i+1})
        Step 7.3.1: b = S(b)          (SQUARE)
        Step 7.3.2: If k_s = 1 then:
            Step 7.3.2.1: b =         (MULT)
            M(b,a[i])
```

| Algorithm A11 - "Square & Multiply", parallelized, from right to left with sliding window of w bits |
| --- |

```
        Step 7.3.3: s = s−1
    Step 7.4: a[0] = M(b,a[0])        (MULT)
Step 8: Return a[0]
```

$k_s$ representing the bit of rank s of the number k

APPENDIX III

Being an Integral Part of the Description $$Q_1 = \begin{vmatrix} 0 & 1 & 0 \\ 1 & 1 & 0 \\ 0 & 1 & 1 \\ 0 & 0 & 1 \\ 0 & 0 & 0 \\ 0 & 0 & 0 \\ 0 & 0 & 1 \\ 0 & 0 & 1 \end{vmatrix}$$

$$Q_2 = \begin{vmatrix} 0 & 1 & 0 \\ 1 & 1 & 0 \\ 0 & 1 & 1 \\ 1 & 1 & 1 \\ 0 & 1 & 1 \\ 0 & 0 & 1 \\ 0 & 0 & 0 \\ 0 & 0 & 0 \\ 0 & 0 & 1 \\ 0 & 0 & 1 \\ 0 & 0 & 1 \\ 0 & 0 & 1 \end{vmatrix}$$

$$Q_3 = \begin{vmatrix} 0 & 1 & 0 \\ 1 & 1 & 0 \\ 0 & 1 & 1 \\ 1 & 1 & 1 \\ 0 & 1 & 1 \\ 1 & 1 & 1 \\ 0 & 1 & 1 \\ 0 & 0 & 1 \\ 0 & 0 & 0 \\ 0 & 0 & 0 \\ 0 & 0 & 1 \\ 0 & 0 & 1 \\ 0 & 0 & 1 \\ 0 & 0 & 1 \\ 0 & 0 & 1 \\ 0 & 0 & 1 \\ 0 & 0 & 1 \end{vmatrix}$$

APPENDIX IV

Being an Integral Part of the Description $$Q = \begin{vmatrix} 0 & 0 & 0 \\ 0 & 0 & 1 \\ 0 & 0 & 1 \\ 1 & 1 & 0 \\ 1 & 1 & 1 \\ 0 & 1 & 1 \\ 0 & 1 & 0 \\ 0 & 1 & 1 \end{vmatrix}$$

The invention claimed is:

1. A method for performing an iterative calculation of exponentiation of a large datum by an exponent formed of a number of bits, the method being implemented in an electronic device and comprising:
   squaring a large variable, by a squaring block comprising a hardware coprocessor;
   multiplying large variables, by a multiplication block comprising a hardware coprocessor;
   storing results, by a buffer memory provided by the squaring block;
   triggering a calculation by the squaring block for each bit of the exponent while the buffer memory is not full of results that have not been used by the multiplication block when the squaring block is inactive;
   storing a result provided by the squaring block in the buffer memory, in association with a value of a group of at least two consecutive bits following a bit of 1 of the exponent, and resetting to zero each bit of the exponent belonging to a single group of at least two consecutive bits;
   triggering a multiplication calculation by the multiplication block for multiplying an unused squaring result in the buffer memory by a multiplication result stored for the value of the group associated with the squaring result and storing the result of the multiplication for the value of the group while the buffer memory contains a squaring result not used by the multiplication block when the multiplication block is inactive; and
   combining the multiplication results stored for the groups by raising the multiplication results stored to the power of two times the value of the group plus 1 and by multiplying among themselves the results of the raising operations obtained.

2. The method of claim 1, comprising triggering a dummy calculation by the squaring block, if the buffer memory is full, if the corresponding bit of the exponent is on 1, and if the squaring block is inactive.

3. The method of claim 1, comprising triggering a dummy calculation by the multiplication block if the buffer memory is empty and if the multiplication block is inactive.

4. The method of claim 1, wherein all the results provided by the squaring and multiplication blocks are used to obtain the result of the exponentiation.

5. The method of claim 1, wherein several results provided by the squaring block are stored in the buffer memory.

6. The method of claim 1, wherein the buffer memory is managed in a cyclical manner, with a write index, a read index and a counter of unused results.

7. The method of claim 1, wherein the buffer memory is configured to store three to five results provided by the squaring block.

8. The method of claim 1, wherein the calculations performed by the squaring and multiplication blocks are modular operations.

9. An electronic device comprising:
   a processor configured to calculate an exponentiation of a large datum by an exponent formed of a number of bits;
   a calculation block for squaring a large variable;
   a calculation block for multiplying large variables; and
   a buffer memory for temporarily storing several results provided by the squaring block, wherein the processor being configured to:
   trigger a calculation by the squaring block for each bit of the exponent while the buffer memory is not full of results not used by the multiplication block when the squaring block is inactive,
   store the result provided by the squaring block in the buffer memory, in association with the value of a group of a certain number of consecutive bits following a bit on 1 of the exponent, and
   reset to zero each bit of the exponent belonging to a single group of at least two consecutive bits,
   trigger a multiplication calculation by the multiplication block for multiplying an unused squaring result in the buffer memory by a multiplication result stored for the value of the group associated with the squaring result and store the result of the multiplication for the value of the group while the buffer memory contains a squaring result not used by the multiplication block and when the multiplication block is inactive, and
   combine the multiplication results stored for the groups by raising the multiplication results stored to the power of two times the value of the group plus 1 and by multiplying among themselves the results of the raising operations obtained.

10. The device of claim 9, wherein the buffer memory is configured to store three to five results provided by the squaring block.

11. The device of claim 9, wherein the squaring and multiplication blocks each comprise a coprocessor of programmable central unit type, or a fully hardware coprocessor of state machine type, or are each performed by a task executed independently of a main program, the tasks and the main program being executed by the multi-core-type processor.

12. The device of claim 9, wherein the processor is configured to trigger a dummy calculation by the squaring block, if the buffer memory is full, if the corresponding bit of the exponent is on 1, and if the squaring block is inactive.

13. The device of claim 9, wherein the processor is configured to trigger a dummy calculation by the multiplication block if the buffer memory is empty and if the multiplication block is inactive.

14. The device of claim 9, wherein all the results provided by the squaring and multiplication blocks are used to obtain the result of the exponentiation.

15. The device of claim 9, wherein several results provided by the squaring block are stored in the buffer memory.

16. The device of claim 9, wherein the buffer memory is managed in a cyclical manner, with a write index, a read index and a counter of unused results.

17. The device of claim 9, wherein the buffer memory is configured to store three to five results provided by the squaring block.

18. The device of claim 9, wherein the calculations performed by the squaring and multiplication blocks are modular operations.

* * * * *